United States Patent
Moritz (10) Patent No.: US 9,956,747 B2
(45) Date of Patent: May 1, 2018

(54) BLUSH AND CHEMICAL RESISTANT POLYESTER FILM

(71) Applicant: Toray Plastics (America), Inc., North Kingstown, RI (US)

(72) Inventor: Jan Moritz, Bristol, RI (US)

(73) Assignee: Toray Plastics (America), Inc., North Kingstown, RI (US)

( * ) Notice: Subject to any disclaimer, the term of this patent is extended or adjusted under 35 U.S.C. 154(b) by 676 days.

(21) Appl. No.: 14/555,542

(22) Filed: Nov. 26, 2014

(65) Prior Publication Data

US 2015/0321822 A1 Nov. 12, 2015

Related U.S. Application Data

(60) Provisional application No. 61/989,605, filed on May 7, 2014.

(51) Int. Cl.
*B32B 27/36* (2006.01)
*B65D 81/24* (2006.01)
(Continued)

(52) U.S. Cl.
CPC ............... *B32B 27/36* (2013.01); *B32B 1/02* (2013.01); *B32B 7/12* (2013.01); *B32B 15/09* (2013.01); *B32B 27/08* (2013.01); *B65B 5/028* (2013.01); *B65B 5/04* (2013.01); *B65B 7/16* (2013.01); *B65D 1/00* (2013.01); *B65D 65/40* (2013.01); *B65D 81/24* (2013.01); *B32B 2250/244* (2013.01); *B32B 2270/00* (2013.01); *B32B 2272/00* (2013.01); *B32B 2307/518* (2013.01); *B32B 2307/558* (2013.01); *B32B 2307/702* (2013.01); *B32B 2439/00* (2013.01); *B32B 2439/70* (2013.01); *Y10T 428/1359* (2015.01); *Y10T 428/266* (2015.01); *Y10T 428/269* (2015.01)

(58) Field of Classification Search
CPC ........ B32B 27/36; B65D 1/00; B65D 1/0215; B65D 1/32; B65D 1/34; B65D 7/12; B65D 7/34; B65D 7/42; B65D 23/02; B65D 23/0814; B65D 65/38; B65D 65/40; B65D 81/3813; B65D 81/3846; B65D 81/3897
See application file for complete search history.

(56) References Cited

U.S. PATENT DOCUMENTS 5,639,414 A 6/1997 Jones et al.
2007/0252303 A1* 11/2007 Loen ............... B29C 43/28
264/219

(Continued)

*Primary Examiner* — Walter B Aughenbaugh
(74) *Attorney, Agent, or Firm* — Rogowski Law LLC (57) ABSTRACT

A composite includes a multilayer polyethylene terephthalate (PET) film having a base layer and an adjacent skin layer. The PET of the skin layer has inherent viscosity of about 0.70-0.90 and carboxyl endgroup concentration of less than 25 eq/T. The base layer can be affixed to a thin metal sheet. Optionally, the base layer of a second multilayer PET film with a skin layer inherent viscosity of about 0.70-0.90 and carboxyl endgroup concentration of less than 25 eq/T can be affixed to the opposite side of the metal sheet. The composite is suited for making food and chemical containers such as food storage cans that resist blush discoloration from steam contact during container formation and age degradation during extended storage of harsh chemical products.

10 Claims, 2 Drawing Sheets

(51) Int. Cl.
*B32B 1/02* (2006.01)
*B32B 15/09* (2006.01)
*B65B 5/04* (2006.01)
*B65B 5/02* (2006.01)
*B65B 7/16* (2006.01)
*B65D 65/40* (2006.01)
*B65D 1/00* (2006.01)
*B32B 27/08* (2006.01)
*B32B 7/12* (2006.01)

(56) References Cited

U.S. PATENT DOCUMENTS

2011/0305913 A1* 12/2011 Hinton ............... B29C 55/065
428/480
2014/0238601 A1 8/2014 Loen et al.

* cited by examiner

BLUSH AND CHEMICAL RESISTANT POLYESTER FILM

FIELD OF THE INVENTION

This invention relates to polyethylene terephthalate (PET) film for metal cans that resist discoloration resulting from exposure to steam during can sterilization and degradation of can appearance resulting from storage of harsh chemicals in the cans. More specifically, it relates to PET film for coating metal of food storage containers, aerosol product containers, and the like, that exhibit little or no blush discoloration or age degradation.

BACKGROUND OF THE INVENTION

Metal containers are used for storage of many different materials in industrial and retail consumer product containment applications. Well known examples of consumer metal storage container utilities include food cans, aerosol spray product cans and the like. Polyester films of various compositions are commonly laminated onto the can metal surface to provide a protective barrier against corrosive environmental conditions. These barrier films are typically laminated onto both sides of the metal so that the inner and outer side metal surfaces of the container are protected from degradation by the contained material and the external ambient environment, respectively. In the case of food containers, after containers are filled, they are exposed to a retort process that typically involves the use of live steam to sterilize the can and pasteurize or partially cook the contents. It is thus very desirable that the plastic and metal laminate structure of the container be able to withstand direct steam contact during such retort process conditions and have sufficient resistance to chemicals and chemically aggressive foods that may be stored in containers made from metal and film laminates.

Retort processing of plastic laminated metal containers can adversely affect the quality of the container. An area of particular interest is a visually observable defect on the outer side of metal containers that manifests as discolored or cloudy spots or areas. In the canning industry this defect is known as "blushing". In the case of plastic film laminated on metal for canned goods, blushing can be attributed to accelerated hydrolysis of the film surface on the outer side of the container promoted by exposure to condensing steam during the retort process.

Another area of particular interest is the chemical resistance of the polymeric film laminated to the inner side of the container. This film can degrade because of contact during the long term storage of harsh chemicals and highly aggressive foods within the containers. Aggressive foods and chemicals can be corrosive to the container metal due to their proximity to ends of the pH scale, especially acidic materials having pH below about 3, and basic materials having pH above about 11. Aggressive foods may be acidic in nature and harsh chemicals may be basic in nature. Some examples of aggressive foods are beets, sauerkraut, and tomato products. Aggressive chemicals such as tub & tile cleaners may have a pH greater than 12.

Much attention has been devoted to the art of blush prevention of metal cans that use plastic film laminates on the outer side of the can. A preferred film composition is polyethylene terephthalate ("PET"). One of the most common methods cited to improve blush resistance uses polybutylene terephthalate ("PBT") blended with PET in at least the outermost surface of the film. In addition, it has been cited that the blend should be at least 60 wt % PBT for effective blushing prevention. However, it has been discovered that films containing high levels of PBT blends in the outer layer or layers do not completely eliminate the blush formation problem. Thus there is a need in the canning industry for a polymeric lamination film that exhibits improved blushing resistance and excellent resistance to harsh chemicals and aggressive foods being stored in these containers. A need exists for polyester films for a protective barrier on the outer side of a metal can that will withstand the rigorous conditions of retort processing without blushing. In addition, it remains desirable to have polyester films to provide a protective barrier on the inside of a metal can that is able to withstand assault by aggressive foods and harsh chemicals during long term storage.

SUMMARY OF THE INVENTION

Accordingly this invention provides a layered composite comprising a first multilayer film about 5 μm to about 75 μm thick, the film comprising a base layer and a skin layer coextensively adjacent and in direct contact with a side of the base layer in which at least 70 wt % of the base layer and the skin layer each independently consists of polyethylene terephthalate (PET), the PET of the skin layer having intrinsic viscosity in the range of about 0.70 to about 0.90 and carboxyl end group concentration less than about 25 eq/T.

The layered composite preferably comprises a metal substrate such as a metal sheet about 50 μm to about 1300 μm thick, in which the first multilayer film is affixed to a first side of the metal sheet positioned such that a side of the base layer opposite the skin layer of the first multilayer film is in direct contact with the first side of the metal sheet. Typically the multilayer film is affixed by lamination, to the metal substrate suitable for use as a material of construction for metal containers in the canning industry. The skin layer with specified intrinsic viscosity and carboxyl end group concentration is intended to protect the metal and the intermediate base layer from exposure to corrosive conditions. Thus food and chemical containers such as food storage cans of the novel layered composite resist blush discoloration from steam contact during container sterilization and age degradation during extended storage of harsh chemical products.

Optionally, a second similar composition multilayer film about 5 μm to about 75 μm thick can be affixed to the opposite side of the metal sheet such that both sides of the metal are coated and protected by the film. The base layer can be composed of multiple component layers such as a core layer and an adhesion layer. The polymer of the adhesion layer can include amorphous polyester copolymer to promote adhesion between the multilayer film and the metal. The skin layer can also optionally contain up to 30% PBT.

There is also provided a container comprising a wall of a layered composite comprising (a) a first multilayer film about 5 μm to 75 μm thick, and (b) a metal sheet about 25 μm to about 50 μm thick, in which the first multilayer film comprises a base layer and a skin layer coextensively adjacent and in direct contact with a side of the base layer, in which at least 70 wt % of the base layer and the skin layer each independently consists of polyethylene terephthalate (PET), the PET of the skin layer having intrinsic viscosity in the range of about 0.70 to about 0.90 and carboxyl end group concentration less than about 25 eq/T, and in which the first multilayer film is affixed to a first side of the metal sheet positioned such that a side of the base layer opposite the skin layer of the first multilayer film is in direct contact with the first side of the metal sheet.

Still further this invention provides a method packaging a product in a container comprising the steps of (I) providing a layered composite comprising (a) a two-sided, metal sheet about 50 μm to about 1300 μm thick, (b) a first multilayer film about 5 μm to about 75 μm thick disposed on one side of the metal sheet, and optionally, (c) a second multilayer film about 5 μm to about 75 μm thick and disposed on the second side of the metal sheet, in which at least one of the first multilayer film and the second multilayer film each independently comprises a base layer and a skin layer coextensively adjacent and in direct contact with a side of the base layer, in which at least 70 wt % of the base layer and the skin layer each independently consists of polyethylene terephthalate (PET), the PET of the skin layer having intrinsic viscosity in the range of about 0.70 to about 0.90 and carboxyl end group concentration less than about 25 eq/T, and in which the first multilayer film and the second multilayer film are affixed to the metal sheet positioned such that a side of the base layer opposite the skin layer is in direct contact respectively with the first side and the second side of the metal sheet, (II) fabricating a container having a wall comprising the layered composite, (III) placing the product in the container, and (IV) sealing the container.

DETAILED DESCRIPTION OF THE INVENTION

Figure 1:
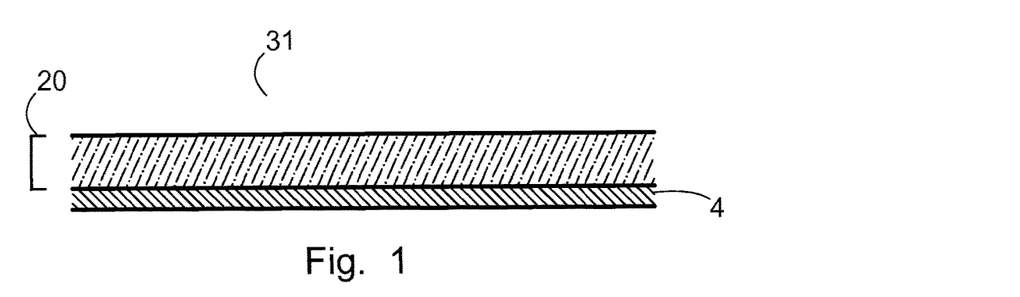
FIG. 1 is an elevation view of a cross section of a composite according to an embodiment of this invention taken perpendicular to the plane of the composite of a two layer polyester film, 31 in which a skin layer 4 is affixed adjacent to a monolithic base layer 20.
Figure 2:
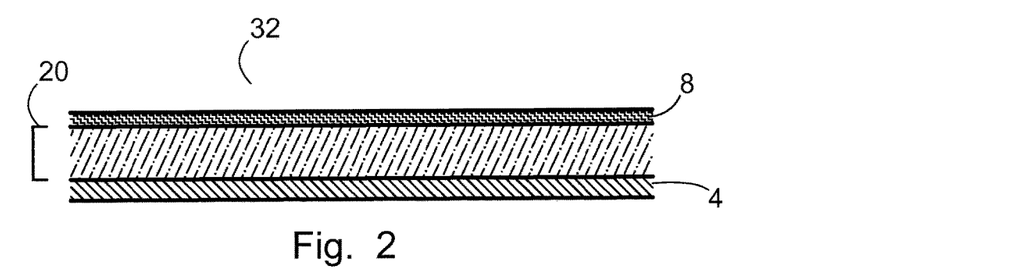
FIG. 2 is an elevation view of a cross section of a composite 32 according to an embodiment of this invention taken perpendicular to the plane of the composite of the two layer polyester film of FIG. 1 in which base layer 20 is laminated to one side of a metal sheet 8.
Figure 3:
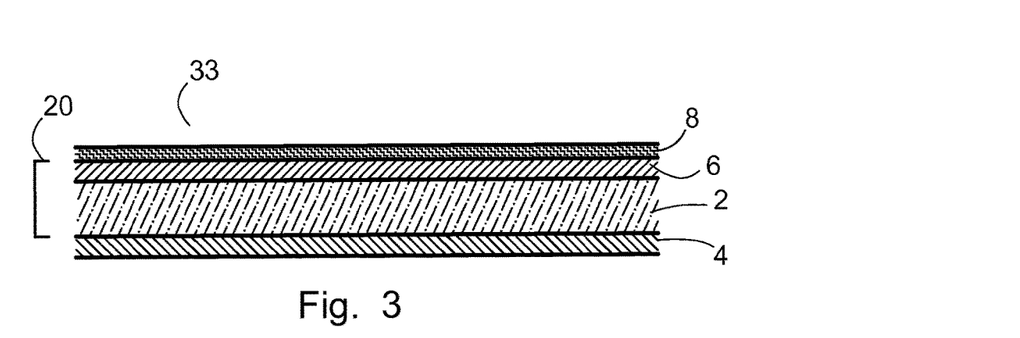
FIG. 3 is an elevation view of a cross section of a composite 33 according to an embodiment of this invention taken perpendicular to the plane of the composite of FIG. 2 in which the base layer 20 further comprises a core layer 2 and an adhesion layer 6 affixed adjacent layer 2 and laminated to metal sheet 8. Thus layer 2 together with adhesion layer 6 constitute base layer 20.
Figure 4:
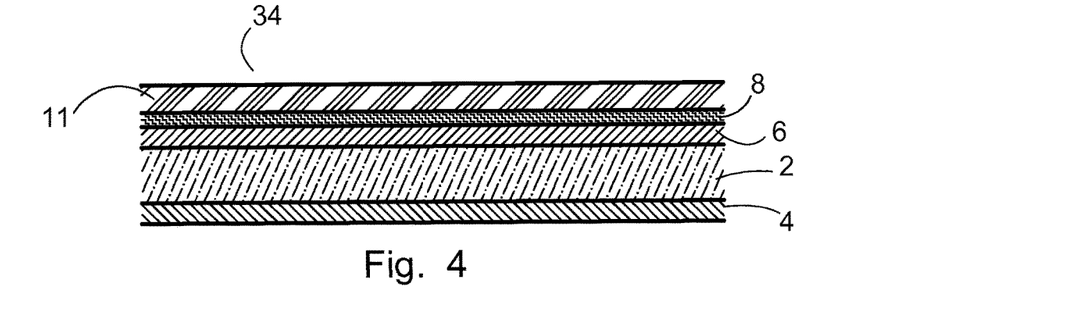
FIG. 4 is an elevation view of a cross section of a composite 34 according to an embodiment of this invention taken perpendicular to the plane of the composite as in FIG. 3 which further comprises a second skin layer 11 laminated to the side of metal sheet 8 opposite of skin layer 4.
Figure 5:
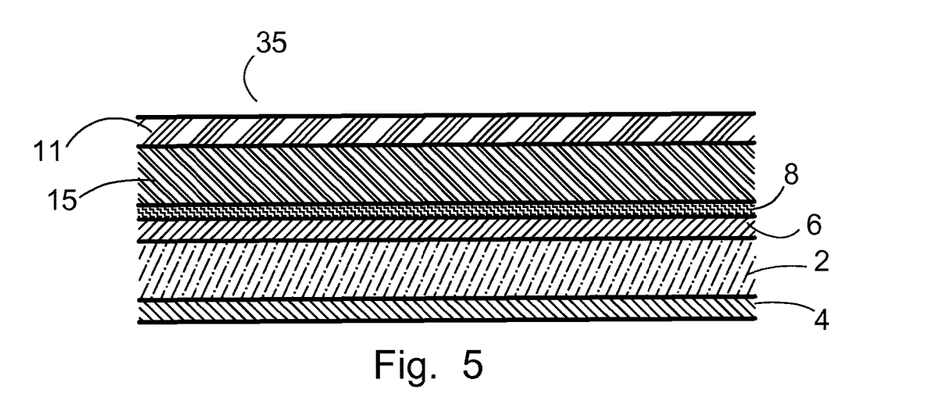
FIG. 5 is an elevation view of a cross section of a composite 35 according to an embodiment of this invention taken perpendicular to the plane of the composite as in FIG. 4 which further comprises a second base layer 15 laminated to the side of metal sheet 8 opposite of skin layer 4 and positioned between second skin layer 11 and the metal sheet 8.

The protective barrier system of this invention employs polymeric film that can be affixed to the surface of a metal substrate so as to coat and thereby protect the metal surface from adverse effects of exposure to contact with corrosive chemicals and steam. The metal substrate is primarily in sheet form having a substantially uniform thickness dimension very much smaller than length and width dimensions. Thickness of the metal sheet is normally in the range of about 50 μm to about 1300 μm (about 2 mils to about 50 mils), and preferably about 150 μm to about 300 μm (about 6 mils to about 12 mils). Typically the polymeric film is affixed to the substrate by lamination. The laminated metal is primarily intended as a raw material in the fabrication of containers for the storage of diverse goods, such as canned food items.

The polymeric films can be laminated on either side or both sides of the metal substrate. In context of laminated metal substrate for containers, the side of the substrate or laminated composite structure facing the contents interior to the container is referred to as the inner side of the substrate or laminated composite structure as the case may be. Similarly, the side of the substrate or laminated composite structure on the exterior of the container is identified as the outer side.

An objective of this invention is to provide a polymer film coated metal composite suitable for fabrication of food storage cans and chemical storage cans, such as are used to package canned foods and chemical goods for individual consumers, for example, household cleaners. To sterilize food-containing cans, the container material is subjected to direct contact with steam. Exposure to steam can cause undesirable discoloration on the outer side surface of the can that is known in the industry as "blushing". After filling and sealing, the inner side of metal food or chemical storage cans are vulnerable to developing undesirable discoloration and/or delamination of the polymer film from the metal. This inner degradation, occasionally referred to herein as "age degradation", results from extended contact of the wall of the can with contained aggressive foodstuff or harsh chemicals during long term storage.

PET is a preferred polymeric composition for this utility, however, PET is subject to blushing and age degradation. Research has shown that blushing of PET is likely the result of accelerated surface hydrolysis. To protect the film from such accelerated surface hydrolysis it has been found to be important to limit the number of total end groups in the surface layer of polymer and to additionally limit the number of carboxyl end groups. "Neat" PET, i.e., a composition in which the only polymer present is polyethylene terephthalate, with low total end groups and low carboxyl endgroups according to this invention has been found to provide excellent resistance to blushing and age degradation.

While the novel neat PET composition provides very desirable blushing and age degradation performance it can have slightly problematic physical properties applicable to metal can utilities. For example, neat PET can be difficult to laminate to the surface of the metal substrate of a container. Issues such as this can be ameliorated by modifying the PET. A preferred modification is inclusion of isophthalic or cyclohexanedimethanol moieties in the chain of polymer in the layer of polymer film that contacts the metal substrate. This modification reduces crystallinity of the polyester and thus improves the laminating ability relative to neat PET.

Another concern with the use of the novel neat PET composition relates to its tensile properties. Neat PET composition according to this invention has lower elongation at break and related characteristics than the lower molecular weight types of PET characterized by lower intrinsic viscosity utilized in many conventional film forming end use applications. Thus the novel neat PET composition when used in a skin layer of polymer film according to this invention is susceptible under extreme or aberrant retort process conditions to developing surface defects such as cracks. Such defects can allow penetration of food or chemicals and lead to age degradation. In an embodiment of this invention, tensile properties of neat PET can be improved by blending a small amount of polybutylene terephthalate (PBT) with the PET. PBT in the skin layer is optional. When present, PBT should be at most 30 wt % of polymer in the skin layer, and preferably the skin layer polymer should be about 5 wt % to about 20 wt % PBT, and more preferably, about 10 wt % to about 15 wt % PBT.

As used in relation to this invention, the term "retort process" means a procedure of contacting a surface with live steam for a period of time. "Live steam" means that steam directly contacts the surface of the container. The steam is usually superheated, i.e., above the boiling point of water. In context of this invention, the surface usually is a wall of a metal container. A nominal retort process calls for exposure to steam at temperature of about 260° F. for 90 minutes. The temperature and duration of exposure of the retort process can vary inversely to provide an approximately equivalent sterilization and food pasteurization effectiveness. For example, the temperature might be higher for a shorter duration or lower for a longer duration.

The metal substrates suitable for use in this inventions are electrolytic chromium coated steel plate (occasionally referred to as "tin free substrate" or "TFS"), electro tin plated steel, aluminum, and the like. The PET film of the inner and outer side of the container can have the same or different physical properties depending on the end use application for the composite. For example, in a canned food utility after packing with food, the container is subjected to a retort process for sterilizing the food contents. Later, during service life the outer side laminated film will be exposed to ambient atmospheric environmental conditions. In contrast, the inner laminated film in addition to the retort process will be subjected to extended time contact with contents that may exhibit potentially adverse interaction with the composite. Thus different inner and outer side polymer films can be utilized where the conditions of exposure are different.

Preferably the PET film suitable for use in this invention is biaxially oriented prior to laminating it to the metal substrate. The films are biaxially oriented by conventional methods. Typically, a raw material PET resin is supplied in solid form to a melt processing device, preferably a continuous screw extruder. The heating of the melt processor is controlled to maintain the PET resin above its melting point but below polymer degradation temperature. PET molten resin is extruded from an appropriately shaped die to form a thin, flat ribbon of polymer melt. The polymer ribbon is quenched in air and or on a chilled roll to form a solid, self-supporting film. The film is taken up by sets of rollers turning at different rotation speeds that stretch the film in the direction of continuous forward motion, referred to as the machine direction ("MD"). The stretching can be accompanied by heating of the film to establish crystal orientation in the MD. The mono-directionally oriented film is clamped at its opposite edges and stretched in the transverse machine direction ("TD") laterally perpendicular to the MD in a tenter oven. The tenter oven is heated to temperatures operative to establish crystal orientation in the TD thus forming a biaxially oriented PET film. Preferably biaxially oriented PET film for use with this invention is stretched about 100%-600% in the MD and 100%-600% in the TD. The biaxially oriented film can be heat set at temperatures preferably between about 300° F. and about 490° F., more preferably about 350° F. to about 460 F.

This invention relies largely on the discovery that blushing and age degradation correlate with concentrations of total end groups and carboxyl end groups of PET. Higher concentrations permit more rapid degradation. Accordingly, total end group and, in particular, carboxyl end group concentrations should be minimized within the bounds of practicable operation limitations. There are several physical properties that can be controlled to obtain PET film resistant to blushing in polymer laminated metal container end use applications according to this invention. One is viscosity of the PET film on the exposed surface of the composite, i.e. surface of the film opposite the metal layer. Higher intrinsic viscosity corresponds to higher polymer molecular weight and therefore fewer total ends per unit mass. It has been found that having an intrinsic viscosity ("IV") in the range of about 0.70 to about 0.90 significantly contributes to blush resistance. Intrinsic viscosities below 0.7 may be ineffective for blush prevention while intrinsic viscosities above 0.9 can be too high to make useful film in standard conventional film extrusion and casting equipment.

Carboxyl end group concentration of PET film is also important. More specifically, the PET of the film on the exposed surface of the composite should have a carboxyl end group concentration less than about 25 equivalents per metric ton (eq/T). The lower the carboxyl end group concentration below the 25 eq/T limit, the better blush resistance performance is obtained. Preferably the carboxyl end group concentration is less than about 20 eq/T. Preference is given to PET having carboxyl end group concentration of about 15 eq/T.

Production of the PET with high IV and low carboxyl end group concentration according to this invention involves techniques well known in the art. For example, low molecular weight, i.e., below IV of 0.70, may be synthesized by simple polyesterification between ethylene glycol and terephthalic acid or as frequently done commercially, by ester interchange melt phase polymerization between dimethyl terephthalate and excess ethylene glycol in first stage during which methanol is removed, followed by removal of glycol at higher temperature and vacuum. PET with IV of 0.70 and above can be made by solidifying and comminuting lower viscosity PET to granular form and conducting further polymerization of the granules in the solid state at elevated temperature and inert gas atmosphere.

The PET film of the inner and outer side of the intermediate metal substrate can each be monolithic, i.e., one layer of a single uniformly composed PET. In such monolithic film, the PET has high intrinsic viscosity and low carboxyl end group concentration within the ranges set forth above to achieve reduced blushing and age degradation. It is recognized that making such PET of high IV and low carboxyl end group concentration according to this invention can add cost associated with molecular weight-increasing techniques such as solid state polymerization, and can require higher thermal laminating conditions compared to more commonly commercially produced, lower IV PET.

For these reasons among others, it can be useful to employ films of multiple layers of PET on one or both sides of the metal substrate. In a preferred embodiment the multi-layer film can have a skin layer and a base layer of one or more core layers. The skin layer is the layer farthest from the metal substrate and has a surface exposed to the contents inside the container or to the ambient environment outside the container as the case might be. Economy is achieved by using conventional PET in the core layers and low total and low carboxyl end group PET only in the skin layer.

In a multi-layer polymer film, a base layer is adjacent in the film thickness direction and in direct contact with the skin layer. In a polymer coated metal substrate composite as used in metal containers, the side of the base layer opposite the skin layer is affixed, typically by lamination to the metal substrate surface. The base layer can be a single layer or an aggregation of multiple layers that include one or more core layers and an adhesion layer. The adhesion layer is the layer of the base layer that is laminated to the metal substrate surface. Core layers are positioned adjacent in the film thickness direction between the skin layer and the adhesion layer. The assembly of skin layer and base layer and core and adhesion layers within the base layer is usually made by a melt process such as coextrusion so that adjacently contacting layers are permanently adhered to each other, i.e., they do not delaminate during retort processing and subsequent aging under normal service conditions. Similarly the monolithic film skin layer or base layer in contact with the metal substrate as the case may be should be applied such that it does not delaminate from the surface of the metal during sterilization or pasteurization and subsequent aging under normal service conditions.

The core and adhesion layers of the base layer can be composed of PET having IV and carboxyl end group concentrations outside of the limits that produce optimum blush resistance provided that there is a skin layer on the side of the metal substrate of that base layer and the skin layer has the novel blush resistant properties. For example the base layer can have an IV in the range of about 0.5 to about 0.70. The IV of the base layer can be in the range of blush resistance, i.e., as high as about 0.90. Preferably the IV of the baselayer is lower than the IV of the skin layer. The carboxyl end group concentration of the base layer can be as high as about 150 eq/T. Preferably the base layer carboxyl end group concentration is less than 100 eq/T, more preferably less than 70 eq/T and most preferably less than 40 eq/T.

One embodiment of a blush resistant film according to this invention has two layers of PET. The intended skin layer is composed of PET with IV in the range of 0.70-0.90 and carboxyl end group concentration less than 25 equivalents per metric ton. The base layer is composed of PET with IV of in the range from 0.55 to less than 0.70 and carboxyl end group concentration of about 70 eq/T.

Blushing is thought to be a phenomenon that occurs predominantly on the exposed surfaces of the polyester film. In a multi-layer film it is preferred to provide a skin layer with minimum thickness effective to impart blush resistance and a thicker base layer of less blush resistant composition. The base layer is thicker than the skin layer and provides barrier properties for traditional protection of the metal substrate and container contents. It also serves to bond the thin skin layer to the metal substrate. The skin layer of a multi-layer PET film can have a thickness in the range of about 0.1 μm to about 25 μm, preferably about 0.2 μm to about 12 μm, and more preferably about 0.3 μm to about 2 μm. Total thickness of the multi-layer film should be about 5 μm to about 75 μm, preferably about 5 μm to about 48 μm, and more preferably about 5 μm to about 25 μm.

Preferably monolithic film or the skin layer of a multi-layer film should be composed completely of PET. Some end use applications may call for better tensile properties than such neat PET provides. Optionally, PBT can be added to the skin layer to enhance elongation properties of the film. Preferably as little PBT as effective to provide satisfactory tensile properties should be used. Preferably about 1 to about 30 wt % of the skin layer should be PBT.

Preferably polymer of the base layer should be completely PET. However, PET can be difficult to laminate to some metal substrates. Modifying PET by incorporating a small amount of a non-terephthalic comonomer moiety has been found effective to improve adhesion to metal. To improve thermal lamination of the multilayer film to metal substrate, crystallinity of the adhesion layer can be reduced by blending PET with effective amounts of amorphous polyester copolymer. Thus further according to this invention the polymer of the adhesion layer, whether a monolithic base layer or an adhesion layer of a multi-layer base layer can be a blend of a PET with 0 wt % to about 19 wt %, preferably about 2-19 wt % of a polyester copolymer of isophthalic acid modified PET (IPET) or cyclohexanedimethanol ("CHDM") modified PET ("PETG").

In embodiments of a three layer blush resistant film according to this invention, the base layer has a skin layer "A" adjacent and in contact with a core layer "B". There also can be an adhesion layer, "C", adjacent and in contact with the side of layer B opposite from layer A. That is, an A/B/C structure. Layers A and C should be free of particulate matter such as additives, fillers and contaminants. Preferably, layer A should be virgin PET.

Some recycled PET can be used in this invention. Recycled PET means PET that has been through a post-polymerization, thermal process such as film forming, yarn spinning, compression molding, thermoforming, and the like. Such processes tend to slightly degrade PET relative to virgin polymer. Thus, it may be difficult to obtain with IV and carboxyl end group concentrations in ranges set forth above to prevent blushing. Layer C can be up to 90 wt % recycled PET provided that the recycled PET has suitable IV for the intended application. Layer B preferably is virgin PET however it can include recycled PET film that may contain particles or optional pigments to create a desired color, such as $TiO_2$ for whitening. IV of PET layer A should be 0.70-0.90, preferably 0.72-0.85 and more preferably 0.75-0.80. Further, Layer A should have a carboxyl end group content of less than 25, and preferably less than 20 equivalents per metric ton. Layer A preferably has a thickness of 0.1 microns to 5 microns, more preferably 0.2 microns to 3.6 microns, and most preferably 0.3 microns to 2 microns. Layer B is composed of a normal film grade PET in which the IV is between 0.55 and 0.75 and preferably between 0.60 and 0.65. Layer B has a thickness of 5 to 50 microns, preferably 7 microns to 36 microns, and more preferably 9 microns to 23 microns. Layer C can be PET. Layer C preferably has a thickness of 0.1 microns to 5 microns, more preferably 0.2 microns to 4 microns, and most preferably 0.3 microns to 3 microns.

Core layer "B" can be a single layer or can comprise a plurality of sublayers. All sublayers should be predominantly, and preferably greater than 70 wt %, PET. The sublayers may differ slightly in source or quality. For example the core can include a sub-layer B1 of virgin PET and another sub-layer B2 of recycled PET. @

The surface roughness, Ra, of the exposed outer surfaces skin layers each independently may be about 5-350 nm, preferably 10-250 nm, and more preferably 15-150 nm.

EXAMPLES

This invention is now illustrated by examples of certain representative embodiments thereof, wherein all parts, proportions and percentages are by weight unless otherwise indicated. The entire disclosures of U.S. Patents named in the following examples are hereby incorporated by reference herein.

Test Methods

Thickness: Overall film thickness of a monolithic film was determined by measuring thickness of a stack of 10 sheets of the film by micrometer and dividing the measurement by 10. Measurements are repeated every 9 inches (22.9 cm) in the transverse direction of the film. Thickness of each coextruded layer of the multilayer film and total thickness were measured by adding alumina pigment particles to alternating film layers effective to differentiate adjacent layers of small cross-sectional pieces of film cut perpendicular to the plane of the film and examined by scanning electron microscope (SEM).

Surface Roughness: Surface roughness was measured with a Surfcorder SE-500 surface roughness measurement instrument (Kosaka Laboratory, Ltd., Japan). The measurements were repeated 3 times and the average value of Ra was recorded.

Intrinsic viscosity: IV was measured using a solution viscometer at 25° C. Sample solution was prepared by dissolving at 103° C. 100±1 mg polymer in 30 mL solution of a mixture of 40% 1,1,2,2-tetrachloroethane and 60% phenol. IV is calculated by the formula, $IV=[(t_{avg}/t_0-1)-2 \ln(t_{avg}/t_0)]0.5/[(sample/20)*(100\%)]$, where $t_{avg}$ and $t_0$ are the average of four trial times in seconds to run dissolved polymer solution and solvent solution only through the viscometer, respectively.

Carboxyl End Group Concentration: Carboxyl end group concentration was determined by ASTM Standard method D7409-07.

Blush resistance: Laminated film-on-metal samples are cut or stamped to circular shape of metal container lids. Tap water at 25° C. is put into 8 oz. metal containers. The sample container lids are attached to the container and placed into a pressure cooker lid-side-down so that the water inside the container is in contact with the lid. A small amount of water is placed in the pressure cooker around the container to generate steam inside the covered pressure cooker when heated to raise temperature of the samples for 90 minutes to 250° F. Samples are allowed to cool and evaluated visually for blushing. Blushing results are evaluated as follows. Excellent: Film is completely clear with no hazing or clouding as compared to a non-steamed control sample. Good: samples show isolated areas of hazing or couding as compared to a non-steamed control sample. Metral substrate is still visible through the film on all parts of the sample. Fair: More than 50% of the sample surface shows clouding or hazing with some areas of the metal substrate is not visible through the film. Poor: Essentially the entire surface of the sample has hazed over to opacity.

Chemical resistance: Laminated film/metal sheets are cut into 2 inch×2 inch (5 cm×5 cm) samples. The samples are reverse impacted using a Gardco impact tester, Model #5512, (Paul N. Gardner Company, Inc., Pompano Beach, Fla.) with 2 lb (4.4 kg) weight and 0.500 inch (1.25 cm) diameter die at a height of 14 cm. Impacted samples are immersed in Walgreens Tub & Tile Cleaner at 100° F. (37.8° C.) and evaluated for delamination and color change after 30, 60, and 90 day soak periods.

Example 1

Coextrude and biaxially orient 15 micron thick film having a 2 micron thick skin layer, "A", of PET having IV of 0.75 and carboxyl end group concentration of about 17 eq/T with a base layer, "B" of PET containing 0.1% SiO2. Laminate the base layer to a 0.0113 inch (0.29 mm) thick tin free substrate of electrolytic chromium coated steel plate at 430° F. (221° C.).

Conduct blush resistance testing as described by the test methods above with the film on the outer side of the container lid. The film maintains excellent adhesion to the steel and maintains a clear appearance with no blushing.

Example 2

Repeat the procedure of Ex. 1 except use an "A/B/C" skin/core/adhesion layer biaxially oriented structure having the following physical properties. The total polymer film thickness is 23 μm. Laminate layer C to the metal plate at temperature of about 350° F. (177° C.) skin layer is the same as in Ex. 1 except that it also contains approximately 0.1% SiO2. Core layer B is PET with an IV of approximately 0.62, carboxyl end group concentration of about 35 eq/T, and is approximately 19 microns in thickness. Adhesion layer, C, is an isophthalic-acid monomer modified amorphous PET. The film maintains excellent adhesion to the steel and maintains a clear appearance with no blushing.

Example 3

Repeat the procedure of Ex. 2 except substitute TiO2 whitening agent for SiO2 in core layer B.

Example 4

Repeat the procedure of Ex. 2 except as follows. Total film thickness is 34 microns. Core layer B is approximately 30 microns in thickness. Adhesion layer, C, of the film is a cyclohexanedimethanol modified (CHDM) amorphous PET and is thermally laminated to the metal plate at a temperature of about 380° F. (193° C.).

Example 5

Repeat the procedure of Ex. 4 except that core layer B contains TiO2 whitening agent.

Example 6

Repeat the procedure of Ex. 2 except that the film is 10 microns thick, and layers A/B/C are 2/6/2 microns thick, respectively.

Example 7

Repeat the procedure of Ex. 4 except that the film is 10 microns thick, and layers A/B/C are 2/6/2 microns thick, respectively.

Comparative Example 8

Repeat procedure of Ex. 1 except laminate base layer B to the metal plate at a temperature of about 500° F. (260° C.).

Comparative Example 9

Coextrude and biaxially orient 15 micron thick film having a skin layer, "A" of PET having less than 1 mole % isophthalate comonomer, IV of about 0.6, a carboxyl end group concentration of about 35 eq/T, and containing 0.1% SiOs. with a 2 micron thick base layer, "B", of PET having IV of 0.6. Laminate the base layer to a 0.0113 inch (0.29 mm) thick tin free substrate of electrolytic chromium coated steel plate at 400° F. (204° C.).

Comparative Example 10

Repeat procedure of Comp. Ex. 1 except that the skin layer A has an IV of 0.6 and carboxyl end group concentration of about 35 eq/T Laminate the base layer B to a 0.0113 inch (0.29 mm) thick substrate of electrolytic chromium coated steel plate at 400° F. (204° C.).

Comparative Example 11

Repeat procedure of Comp. Ex. 10 except that the base layer B is laminated to the metal plate at 500° F. (260° C.).

Example 12

Repeat procedure of Ex. 1 except that skin layer A is a blend of 90 wt % PET and 10 wt % polybutylene terephthalate ("PBT").

Comparative Example 13

Repeat procedure of Ex. 12 except laminate the base layer B to the metal plate at a temperature of about 500° F. (260° C.).

Example 14

Repeat procedure of Ex. 12 except for skin layer A use a polymer that is a blend of 70 wt % PET and 30 wt % PBT.

Comparative Example 15

Repeat procedure of Ex. 14 except laminate the base layer to the metal plate at a temperature of about 500° F. (260° C.).

Example 16

Repeat procedure of Ex. 12 except for skin layer A use a polymer that is a blend of 50 wt % PET and 50 wt % PBT.

Comparative Example 17

Repeat procedure of Ex. 16 except laminate the base layer to the metal plate at a temperature of about 500° F. (260° C.).

A summary of the conditions of the examples is presented in Table 1. The materials from the examples were evaluated for ease of lamination onto the metal plate, adhesion to the metal plate, blushing resistance and chemical resistance according to the test methods described above. Results of the examples are presented in Table 2.

Examples 1-7 demonstrate that films of exclusively or substantially completely PET and having a skin layer of IV at least 0.75 with carboxyl end group concentrations below 25 eq/T provide good to excellent adhesion to canning metal and have excellent blushing resistance. These compositions also have fair to good and occasionally excellent chemical resistance. The compositions can be laminated onto metal substrate at moderate temperatures of up to 440° F. (227° C.) with good to excellent processability. Examples 2, 3, and 6 show that an adhesive layer of polyethyleneterephthalate modified with cycloaliphatic comonomer and isophthalate monomer components also have good metal adhesion.

Comparative Examples 8, 11, 15 and 17 show that excessive heating of lamination to metal can reduce blushing and chemical resistance. Comp. Exs. 9 and 11 show that high intrinsic viscosity of the skin layer is important to obtain good blush resistance. Comp. Exs. 12-17 demonstrate that exclusively or substantially completely PET film with the preferred IV and carboxyl end group concentration can provide as good chemical resistance and better blush resistance than the state of the art PET/PBT blends. Blush resistance degrades with as little as 10 wt % PBT and diminishes further with increasing PBT up to 50 wt % composition.

TABLE 1

|  | Ex 1 | Ex 2 | Ex 3 | Ex 4 | Ex 5 | Ex 6 | Ex 7 | Comp. Ex 8 | Comp. Ex 9 |
|---|---|---|---|---|---|---|---|---|---|
| FT, μm | 15 | 23 | 23 | 34 | 34 | 10 | 10 | 15 | 15 |
| LamT deg. F. | 430 | 350 | 350 | 380 | 380 | 350 | 380 | 500 | 400 |
| Layer A |  |  |  |  |  |  |  |  |  |
| μm | 2 | 2 | 2 | 2 | 2 | 2 | 2 | 2 | 13 |
| PET IV | 0.75 | 0.75 | 0.75 | 0.75 | 0.75 | 0.75 | 0.75 | 0.75 | 0.6 |
| PET COOH | 17 | 17 | 17 | 17 | 17 | 17 | 17 | 17 | 35 |
| SiO2 wt % | n/a | 0.1 | 0.1 | 0.1 | 0.1 | 0.1 | 0.1 | n/a | 0.1 |
| PBT wt % | n/a | n/a | n/a | n/a | n/a | n/a | n/a | n/a | n/a |
| IPET mole % | n/a | n/a | n/a | n/a | n/a | n/a | n/a | n/a | <1% |
| Layer B |  |  |  |  |  |  |  |  |  |
| LT μm | 13 | 19 | 19 | 30 | 30 | 6 | 6 | 13 | 2 |
| PET IV | 0.6 | 0.62 | 0.62 | 0.62 | 0.62 | 0.62 | 0.62 | 0.6 | 0.6 |
| PET COOH | 35 | 35 | 35 | 35 | 35 | 35 | 35 | 35 | ND |
| SiO2 wt % | 0.1 | n/a | n/a | n/a | n/a | n/a | n/a | 0.1 | n/a |
| TiO2 wt % | n/a | n/a | 10 | n/a | 10 | n/a | n/a | n/a | n/a |
| iPET mol % | n/a | n/a | n/a | n/a | n/a | n/a | n/a | n/a | n/a |
| Layer C |  |  |  |  |  |  |  |  |  |
| LT μm | n/a | 2 | 2 | 2 | 2 | 2 | 2 | n/a | n/a |
| PET IV | n/a | 0.68 | 0.68 | ND | ND | 0.68 | ND | n/a | n/a |
| PETCOOH | n/a | 33 | 33 | ND | ND | 33 | ND | n/a | n/a |
| iPET mol % | n/a | 19 | 19 | n/a | n/a | 19 | n/a | n/a | n/a |
| CHDM mol % | n/a | n/a | n/a | 14 | 14 | n/a | 14 | n/a | n/a |

TABLE 1-continued

|  | Comp. Ex 10 | Comp. Ex 11 | Ex 12 | Comp. Ex 13 | Ex 14 | Comp. E 15 | Ex 16 | Comp. Ex 17 |
|---|---|---|---|---|---|---|---|---|
| FT, μm | 15 | 15 | 15 | 15 | 15 | 15 | 15 | 15 |
| LamT deg. F. | 400 | 500 | 430 | 500 | 430 | 500 | 430 | 500 |
| Layer A |  |  |  |  |  |  |  |  |
| μm | 2 | 2 | 2 | 2 | 2 | 2 | 2 | 2 |
| PET IV | 0.6 | 0.6 | 0.79 | 0.79 | 0.86 | 0.86 | 0.93 | 0.93 |
| PET COOH | 35 | 35 | 18 | 18 | 21 | 21 | 24 | 24 |
| SiO2 wt % | 0.1 | 0.1 | 0.1 | 0.1 | 0.1 | 0.1 | 0.1 | 0.1 |
| PBT wt % | n/a | n/a | 10 | 10 | 30 | 30 | 50 | 50 |
| IPET mole % | n/a | n/a | n/a | n/a | n/a | n/a | n/a | n/a |
| Layer B |  |  |  |  |  |  |  |  |
| LT μm | 13 | 13 | 13 | 13 | 13 | 13 | 13 | 13 |
| PET IV | 0.6 | 0.6 | 0.6 | 0.6 | 0.6 | 0.6 | 0.6 | 0.6 |
| PET COOH | 35 | 35 | 35 | 35 | 35 | 35 | 35 | 35 |
| SiO2 wt % | 0.1 | 0.1 | 0.1 | 0.1 | 0.1 | 0.1 | 0.1 | 0.1 |
| TiO2 wt % | n/a | n/a | n/a | n/a | n/a | n/a | n/a | n/a |
| iPET mol % | <1 | <1 | n/a | n/a | n/a | n/a | n/a | n/a |
| Layer C |  |  |  |  |  |  |  |  |
| LT μm | n/a | n/a | n/a | n/a | n/a | n/a | n/a | n/a |
| PET IV | n/a | n/a | n/a | n/a | n/a | n/a | n/a | n/a |
| PETCOOH | n/a | n/a | n/a | n/a | n/a | n/a | n/a | n/a |
| iPET mol % | n/a | n/a | n/a | n/a | n/a | n/a | n/a | n/a |
| CHDM mol % | n/a | n/a | n/a | n/a | n/a | n/a | n/a | n/a |

Legend:
FT = total film thickness
Lam T = lamination thickness
COOH = carboxyl end group concentration eq/T
LT = layer thickness
iPET = isophthalic acid derivative copolymer concentration
CHDM = cyclohexanedimethanol comonomer concentration
ND = no data provided

TABLE 2

| Example | Ease of Lamination | Adhesion | Blushing resistance | Chemical resistance |
|---|---|---|---|---|
| Ex. 1 | Good | Good | Excellent | Excellent |
| Ex. 2 | Excellent | Good | Excellent | Fair |
| Ex. 3 | Excellent | Good | Excellent | Fair |
| Ex. 4 | Excellent | Excellent | Excellent | Good |
| Ex. 5 | Excellent | Excellent | Excellent | Good |
| Ex. 6 | Excellent | Good | Excellent | Fair |
| Ex. 7 | Excellent | Excellent | Excellent | Good |
| Comp. Ex. 8 | Good | Excellent | Poor | Good |
| Comp. Ex. 9 | Excellent | Excellent | Poor | Poor |
| Comp. Ex. 10 | Excellent | Excellent | Fair | Good |
| Comp. Ex. 11 | Excellent | Excellent | Poor | Poor |
| Ex. 12 | Good | Excellent | Good | Good |
| Comp. Ex. 13 | Good | Excellent | Fair | Good |
| Ex. 14 | Good | Excellent | Good | Good |
| Comp. Ex. 15 | Good | Excellent | Poor | Good |
| Ex. 16 | Good | Excellent | Good | Good |
| Comp. Ex. 17 | Good | Excellent | Poor | Good |

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope of the following claims.

What is claimed is:

1. A layered composite, comprising:
   a first multilayer film about 5 μm to about 75 μm thick, the film comprising a base layer and a skin layer coextensively adjacent and in direct contact with a side of the base layer, in which at least 70 wt % of the base layer and the skin layer each independently consists of polyethylene terephthalate (PET), wherein the PET of the base layer has intrinsic viscosity less than about 0.70, and the PET of the skin layer has intrinsic viscosity in the range of about 0.70 to about 0.90 and carboxyl end group concentration less than about 25 eq/T;
   one metal sheet about 50 μm to about 1300 μm thick, in which the first multilayer film is affixed to a first side of the metal sheet positioned such that a side of the base layer opposite the skin layer of the first multilayer film is in direct contact with the first side of the metal sheet; and
   a second multilayer film about 5 μm to about 75 μm thick, the second multilayer film comprising a second base layer and a second skin layer coextensively adjacent and in direct contact with a side of the second base layer, in which at least 70 wt % of the second base layer and the second skin layer each independently consists of PET, the PET of the second skin layer having intrinsic viscosity in the range of about 0.70 to about 0.90 and carboxyl end group concentration less than about 25 eqT, and in which the second multilayer film is affixed to a second side of the metal sheet positioned such that a side of the second base layer opposite the second skin layer is in direct contact with the second side of the metal sheet,
   wherein the first multilayer film and the second multilayer film as affixed to the metal sheet remain clear with no hazing or clouding after exposure to steam for 90 minutes or more.

2. The composite of claim 1 in which the skin layer has a thickness from about 0.1 μm to about 25 μm.

3. The composite of claim 1 in which the base layer comprises an adhesion layer about 0.1-5 μm thick and a core layer, in which the adhesion layer is on a side of the base layer opposite the skin layer and consists essentially of a blend of about 2-19 wt % amorphous polyester copolymer and a complementary amount to total 100 wt % of PET.

4. The composite of claim 3 in which the amorphous polyester copolymer is selected from the group consisting of isophthalic acid modified polyethylene terephthalate (PET) and cyclohexanedimethanol modified polyethylene terephthalate (PETG).

5. The composite of claim 1 in which the PET of the base layer has carboxyl end group concentration greater than about 25 eq/T.

6. The composite of claim 1 in which the skin layer consists essentially of a blend of PET and polybutylene terephthalate (PBT) in which the PBT is about 5 to about 30 wt % of the blend.

7. The composite of claim 1 that is free of polybutylene terephthalate.

8. The composite of claim 1 that is free of pigment.

9. The composite of claim 1 in which the base layer comprises an adhesion layer about 0.1-5 μm thick and a core layer coextensively adjacent in direct contact with the adhesion layer, in which the adhesion layer is positioned on a side of the base layer opposite the skin layer such that the adhesion layer is in direct contact with the first side of the metal sheet, and in which the adhesion layer consists essentially of a blend of about 2-19 wt % of an amorphous polyester copolymer and a complementary amount to total 100 wt % of PET.

10. The composite of claim 1 in which the second base layer comprises a second adhesion layer about 0.1-5 μm thick and a second core layer coextensively adjacent in direct contact with the second adhesion layer, in which the second adhesion layer is positioned-on a side of the second base layer opposite the second skin layer such that the second adhesion layer is in direct contact with the second side of the metal sheet, and in which the second adhesion layer consists essentially of a blend of about 2-19 wt %/o of an amorphous polyester copolymer and a complementary amount to total 100 wt % of PET.

* * * * *